(12) United States Patent
Hummel

(10) Patent No.: US 10,345,189 B2
(45) Date of Patent: Jul. 9, 2019

(54) DEVICE AND METHOD FOR PERFORMING A LEAK TEST ON FUEL ROD CAPSULES

(71) Applicant: FRAMATOME GmbH, Erlangen (DE)

(72) Inventor: Wolfgang Hummel, Neumarkt (DE)

(73) Assignee: FRAMATOME GMBH, Erlangen (DE)

( * ) Notice: Subject to any disclaimer, the term of this patent is extended or adjusted under 35 U.S.C. 154(b) by 145 days.

(21) Appl. No.: 15/535,876

(22) PCT Filed: Dec. 7, 2015

(86) PCT No.: PCT/EP2015/078808
§ 371 (c)(1),
(2) Date: Jun. 14, 2017

(87) PCT Pub. No.: WO2016/096499
PCT Pub. Date: Jun. 23, 2016

(65) Prior Publication Data
US 2018/0010979 A1    Jan. 11, 2018

(30) Foreign Application Priority Data

Dec. 15, 2014   (DE) .................. 10 2014 118 623

(51) Int. Cl.
*G01M 3/20* (2006.01)
*G21C 17/07* (2006.01)
*G21C 19/07* (2006.01)

(52) U.S. Cl.
CPC ............. *G01M 3/205* (2013.01); *G21C 17/07* (2013.01); *G21C 19/07* (2013.01)

(58) Field of Classification Search
CPC ........... G21F 5/008; G21F 5/12; G21C 17/07; G21C 17/002; G01M 3/202
See application file for complete search history.

(56) References Cited

U.S. PATENT DOCUMENTS 3,073,767 A * 1/1963 Whitham ............... G21C 17/07
376/253
3,247,706 A * 4/1966 Rose ..................... G01M 3/202
376/251

(Continued)

FOREIGN PATENT DOCUMENTS

DE    1176899 B1    8/1964
DE    1922592 A     1/1970

(Continued)

OTHER PUBLICATIONS

International Preliminary Report on Patentability as received in PCT/EP2015/078808 filed Dec. 7, 2015.

*Primary Examiner* — David A Rogers
(74) *Attorney, Agent, or Firm* — Keller Jolley Preece

(57) ABSTRACT

The invention relates to a device for performing a leak test on a fuel rod capsule, which contains at least one fuel rod and test gas, which device comprises a test container, which is designed to accommodate at least one fuel rod capsule and can be lowered into a pool of a nuclear plant flooded with water. According to the invention, a mass spectrometer is fluidically connected to the interior of the test container in such a way that a gas flow can be fed to the mass spectrometer in order to sense the concentration of the test gas that has diffused into the test container from the fuel rod capsule.

26 Claims, 2 Drawing Sheets

(56) References Cited

U.S. PATENT DOCUMENTS

| | | | | |
|---|---|---|---|---|
| 3,945,245 A * | 3/1976 | Stehle | G21C 17/07 | 374/5 |
| 4,034,599 A * | 7/1977 | Osborne | G21C 17/07 | 376/253 |
| 4,082,607 A | 4/1978 | Divona | | |
| 4,117,333 A * | 9/1978 | John, Jr. | G21C 17/07 | 250/380 |
| 4,126,514 A * | 11/1978 | Wonn | G21C 17/07 | 376/252 |
| 4,184,362 A * | 1/1980 | Standley | G01M 3/202 | 73/40.7 |
| 4,193,843 A * | 3/1980 | Womack | G21C 17/07 | 376/252 |
| 4,313,791 A * | 2/1982 | Lawrie | G01N 29/225 | 376/252 |
| 4,366,711 A * | 1/1983 | Weilbacher | G01N 29/041 | 376/252 |
| 4,443,402 A * | 4/1984 | Marini | G21C 17/07 | 376/252 |
| 4,684,493 A * | 8/1987 | Gravelle | G21C 17/07 | 376/252 |
| 5,009,835 A * | 4/1991 | Ahmed | G01M 3/202 | 376/251 |
| 5,235,624 A * | 8/1993 | Bordy | G21C 17/07 | 376/245 |
| 5,414,742 A * | 5/1995 | Hornak | G21C 17/07 | 376/250 |
| 5,457,720 A * | 10/1995 | Snyder | G01N 30/62 | 376/253 |
| 5,544,208 A * | 8/1996 | Pao | G01N 30/62 | 376/250 |
| 5,570,400 A * | 10/1996 | Minor | G21C 17/07 | 376/245 |
| 5,754,610 A * | 5/1998 | Morris | G21C 17/07 | 376/253 |
| 8,130,895 B2 * | 3/2012 | Veron | G21C 19/26 | 250/507.1 |
| 9,412,475 B2 * | 8/2016 | Lee | G21C 17/07 | |
| 2006/0283235 A1 | 12/2006 | Gerdau et al. | | |
| 2007/0104305 A1 * | 5/2007 | Veron | G21C 19/26 | 376/261 |
| 2012/0145890 A1 * | 6/2012 | Goodlett | H01J 49/0454 | 250/282 |

FOREIGN PATENT DOCUMENTS

| | | |
|---|---|---|
| DE | 2700952 C2 | 3/1979 |
| DE | 19542330 A1 | 5/1996 |
| EP | 1207380 A1 | 7/2000 |
| EP | 1974357 B1 | 4/2009 |
| FR | 2509898 A1 | 1/1983 |
| JP | 3160399 A | 7/1991 |
| WO | WO 2007/071337 A1 | 6/2007 |

* cited by examiner

DEVICE AND METHOD FOR PERFORMING A LEAK TEST ON FUEL ROD CAPSULES

CROSS-REFERENCE TO RELATED APPLICATIONS

This application is a national phase entry under 35 U.S.C. § 371 of International Application No. PCT/EP2015/078808, filed Dec. 7, 2015, which claims the benefit of German Application No. 10 2014 118 623.0, filed Dec. 15, 2014. The entire contents of each of the foregoing patent applications are hereby incorporated by reference.

BACKGROUND OF THE INVENTION

1. Technical Field

The invention relates to a device for carrying out a leak test on a fuel rod capsule containing at least one fuel rod and test gas, the device comprising a test container which is designed for accommodating at least one fuel rod capsule and which is lowerable into a water-flooded pool of a nuclear plant. The invention further relates to a method for carrying out the leak test on the fuel rod capsule containing at least one fuel rod and test gas, using such a device.

2. Background and Relevant Art

It is known that fuel rods of nuclear reactors may develop leaks during operation; i.e., water may penetrate into the fuel rods. As soon as a fuel rod with such a defect is identified, it is typically encapsulated underwater in a fuel rod capsule in order to counteract escape of radioactive fission products, in particular radioactive gases. The encapsulation of the fuel rod takes place at a sufficient depth that the opening and closing of the fuel rod capsule takes place by remote control by means of suitable manipulators. After the fuel rod capsule is opened and the fuel rod is inserted, the water that has penetrated into the fuel rod capsule is displaced by blowing in a test gas, and the fuel rod capsule is transferred into an encapsulation device. In this encapsulation device, the fuel rod situated in the fuel rod capsule is heated by passing hot test gas through the fuel rod capsule, thus evaporating the water present in the fuel rod. After the water vapor has been removed from the encapsulation device by drying the test gas or replacing the moist gas with dry test gas, the fuel rod capsule is closed and welded at the closure point. After the welded, and thus leak-tight, fuel rod capsule is removed from the encapsulation device, the fuel rod capsule must be further tested for leak-tightness. The fuel rod capsule containing the fuel rod is then optionally temporarily stored in a spent fuel pool filled with water before it can be transported to a final repository or a reprocessing plant.

It is known to test the fuel rods per se or the fuel rod capsule containing the at least one fuel rod for leak-tightness.

A method for testing the leak-tightness of fuel rods is known from DE 195 42 330 A1, for example, in which gases that escape from the fuel element are analyzed for their gaseous fission product content.

WO 2007/071337 describes the testing of fuel rod capsules containing at least one fuel rod. The fuel rod capsule is introduced into a test container situated inside a flooded pool of a nuclear plant, beneath the water surface. Leaks are detected by means of an underwater camera, and a leak rate is estimated based on the number and size of the detected gas bubbles.

SUMMARY

Proceeding from this prior art, the object of the present invention is to improve the leak testing of fuel rod capsules in such a way that leak rates may be determined in a particularly accurate manner.

With regard to the device, the object is achieved by the device for carrying out the leak test of the type mentioned at the outset, having the further features of Patent Claim 1.

Advantageous embodiments of the invention are the subject matter of the subclaims.

A device for carrying out a leak test on a fuel rod capsule containing at least one fuel rod and test gas includes a test container which is designed for accommodating at least one fuel rod capsule, and which is lowerable into a water-flooded pool of a nuclear plant. According to the invention, a mass spectrometer is fluidically connectable to the interior of the test container in such a way that the mass spectrometer may be supplied with a gas stream for detecting a concentration of the test gas that has diffused from the fuel rod capsule into the test container.

The overall process of the leak testing, the same as the process of encapsulating the fuel rod, may thus be carried out underwater. For this purpose, the test container is lowered into the pool, for example a spent fuel pool, of a nuclear power plant. The fuel rod capsule contains, in addition to the at least one fuel rod, test gas that is under a known, predefined pressure. The test gas diffuses into the interior of the test container through leaks that may be present in the fuel rod capsule. The interior of the test container is connected to the mass spectrometer via lines, and optionally by valves situated in between, so that the test gas may be supplied to the mass spectrometer after a fluidic connection has been established. The selective detection of the test gas by means of the mass spectrometer allows a particularly accurate determination of the concentration of the test gas contained in the gas stream. The leak rate, which is derived from the concentration of the test gas determined in this way, is therefore more accurate.

Helium is typically used as a test gas for leak testing according to common industry standards. However, as a departure therefrom, in the present application it has proven to be particularly advantageous to provide argon as the test gas. The mass spectrometer is therefore preferably designed for detecting the concentration of the argon that has diffused from the fuel rod capsule. After the fuel rods have been encapsulated in fuel rod capsules underwater, the presence of a certain amount of residual moisture within the fuel rod capsule cannot be ruled out. The same applies for the test container itself, which typically is flooded with water from the pool during introduction of the fuel rod capsule. Therefore, the interior of the fuel rod capsule or of the test container cannot be completely dried before the testing of the leak-tightness takes place. This is problematic in particular when a test of the leak-tightness is to take place by use of a mass spectrometrically detected concentration of helium that has diffused out, since helium and the hydrogen originating from the residual moisture have comparable atomic weights. The measuring results therefore have a relatively high level of inaccuracy if helium is used as the test gas. This problem may be avoided when argon, which has a greatly different atomic weight from hydrogen, is filled as test gas under a defined pressure inside the fuel rod capsule.

Alternatively, some other inert gas may be used as the test gas.

In one preferred exemplary embodiment, the test container has an evacuable design, such that an internal pressure that is reduced compared to a hydrostatic pressure caused by water surrounding the test container is settable in the interior of the test container. In other words, the interior of the test container may be insulated from the hydrostatic pressure of the surroundings, in particular by means of valve systems or the like, in such a way that the internal pressure inside the test container may be set to a value that is suitable for the leak testing, for example by means of vacuum pumps. This is desirable in particular for specifying defined criteria in determining the leak rates, whereby the pressure difference prevailing between the interior of the fuel rod capsule and the interior of the test container must be known. A suitable lowering of the internal pressure inside the test container with respect to the pressure prevailing inside the fuel rod capsule facilitates the diffusion of the test gas from the fuel rod capsule, so that the testing operation takes less time.

The test container at a lower end preferably has a connection device that connects to the interior of the pool. The connection device is used as an outlet for water which is present in the test container and which has penetrated during introduction of the at least one fuel rod capsule. To this end, it is provided in particular to introduce a purge gas under pressure into the interior of the test container, the purge gas displacing the water and expelling it into the pool via the connection device, which is situated at the lowest point in the test container. For this purpose, the conveying of the purge gas to the test container may take place, for example, by means of a vacuum pump having an appropriate delivery rate. Emptying the test container of essentially all water is desirable in particular in exemplary embodiments that use argon as the test gas. Argon has comparatively good water solubility; thus, residual water remaining in the test container may significantly influence and skew the measuring results.

The upper end of the test container is particularly preferably fluidically connectable to a first reservoir in which purge gas is storable under pressure. The purge gas in the first reservoir is under such high pressure that a test container filled with water may be completely flooded with purge gas by providing a fluidic connection between the first reservoir and the test container, for example by opening valves. For this purpose, the pressure inside the first reservoir must be higher than the hydrostatic pressure that is produced by the water surrounding the test container. A device designed in this way has a particularly simple and robust construction, since high-maintenance conveying devices, in particular vacuum pumps, for conveying the purge gas are avoided.

The first reservoir is preferably fluidically connectable to a sampling point of the mass spectrometer. It is thus possible to flush lines, which connect the gas stream to the mass spectrometer, with purge gas and optionally dry them.

In one refinement of the invention, a second reservoir is provided in which test gas is storable under pressure. The second reservoir may likewise be fluidically connected to the sampling point, for example via a suitable valve position. Supplying to the sampling point takes place for purposes of calibrating the mass spectrometer. The test gas is stored in the second reservoir under a known pressure and suppliable to the sampling point in a controlled manner, so that the calibration of the mass spectrometer takes place under defined conditions. The test gas includes the purge gas containing a small proportion of test gas. The concentration of the test gas contained in the purge gas is slightly above the detection limit of the mass spectrometer, so that the latter may be calibrated by the controlled supplying of test gas.

At least one volume control valve is preferably [situated] between the sampling point and the first reservoir and/or between the sampling point and the second reservoir in order to set the volumetric flow of the purge gas or test gas. By means of the at least one volume control valve for the test gas, the volumetric flow is variable and settable to values in such a way that a precise calibration of the mass spectrometer is ensured.

In addition, in one preferred exemplary embodiment the connection device provided at the lower end of the test container may be additionally used for controlled flooding of the test container with water from the pool. In this exemplary embodiment, the interior of the test container at an upper end is fluidically connectable to a sampling point of the mass spectrometer, for example by means of valve systems or the like, in such a way that conveying of the gas column, present in the test container, to the sampling point is made possible due to the introduction of water via the connection device. According to this embodiment, it is thus possible to utilize the hydrostatic pressure of the surrounding water to supply a gas column, present in the test container—and in the case of a leak, containing test gas—virtually completely to the mass spectrometer by flooding the test container in a controlled manner with water from the pool.

In one specific exemplary embodiment, the connection device for the controlled flooding of the test container includes a gas exchange device. The gas exchange device includes an inner container over which the second container is pulled. Water from the pool, which may sometimes contain dissolved argon, is situated in the inner container. When the test container is blown out with purge gas, in particular nitrogen, purge gas is blown into the inner container, as the result of which a gas exchange takes place in the water. In this regard, in particular argon may be largely replaced by nitrogen. Due to blowing purge gas into the inner container, the surrounding second container is filled with purge gas. As a result, a hermetic separation from the surrounding pool is present due to the outer container. The volumes of the first and second containers may be dimensioned in such a way that, during the process of return flow (measuring phase) of the water present in the inner container into the test container, no water advances from the pool via the outer container to the inner container before the water level in the test container reaches the pool water level. This is meaningful in particular when argon is used as test gas, since dissolved argon may always be present in the water.

A volumetric flow of the gas stream supplied to the sampling point of the mass spectrometer is preferably changeable, in particular controllable or regulatable, by means of an adjustment device, for example at least one further volume control valve or a vacuum pump. The withdrawal at the sampling point thus preferably takes place at constant pressure to avoid skewing of the measuring results. The pumping capacity of the vacuum pump and/or the outlet of the volume control valve may be appropriately varied for controlling or regulating the pressure at the sampling point.

The adjustment device, in particular the further volume control valve or the vacuum pump, is particularly preferably connected to a pressure sensor for measuring the pressure at the sampling point.

According to one possible exemplary embodiment, the test container is designed for accommodating only a single fuel rod capsule. In an alternative exemplary embodiment, the test container is dimensioned in such a way that multiple fuel rod capsules may be accommodated.

The at least one fuel rod capsule is preferably introducible into the test container via a closeable opening on the end. For closing the fuel rod capsule, screw connections may be used, although integrally bonded weld connections in particular are also commonly used.

The most accurate knowledge possible of the remaining state variables, in particular the temperature, is desirable for precisely determining the leak rate. Therefore, temperature sensors are preferably provided at various components of the device in order to detect the temperature.

According to possible embodiments of the invention, the device includes components, in particular lines and/or line sections, that are situated inside the pool, underwater, and also outside the pool. Due to the decay heat of the fuel, a slightly increased, virtually constant temperature of approximately 30° C. to 40° C. prevails within the pool. Therefore, due to the cooler surroundings, the components situated outside the pool often have a lower temperature, which facilitates condensation of the gas stream while it is being supplied to the sampling point. However, such condensation may skew the measuring results. Therefore, a temperature that is as constant as possible preferably prevails in the entire area of the device. To ensure this, the components of the device situated outside the pool are provided, at least in sections, with thermal insulation.

In one refinement of the invention, a heating device is provided, by means of which the components of the device situated outside the pool are heatable, at least in sections. In this way the temperature gradients that occur are at least reduced in order to prevent condensation in particular in the area of the sampling point. The temperature at the sampling point should preferably be set to the temperature present in the pool, by means of the heating device.

With regard to the method, the object is achieved by a method for carrying out a leak test of the type stated at the outset, having the additional features of Patent Claim 15.

In the method for carrying out the leak test on the fuel rod capsule containing at least one fuel rod and test gas, one of the above-described devices is used, so that reference is first made to the preceding embodiments.

For testing the leak-tightness, the at least one fuel rod capsule is introduced into the test container that is lowered into the flooded pool of a nuclear plant. According to the invention, the gas stream containing test gas that has diffused from the fuel rod capsule into the test container is supplied to a mass spectrometer. In addition, a concentration of the test gas that has diffused from the fuel rod capsule into the test container is detected in the gas stream by means of the mass spectrometer in order to determine the leak rate.

To this end, it is provided in particular that the leak rate is determined indirectly. To verify that an allowable leak rate has not been exceeded, the detected concentration of the test gas must remain below a predefined threshold value after a preset measuring period has elapsed (period of release of the test gas into the test container), whereby it must be ensured that the concentration of the test gas to be measured is above the detection limit of the mass spectrometer.

In the case that argon is used as test gas, the detection limit of the mass spectrometer is typically between 10 parts per billion (ppb) and 1 part per million (ppm).

The at least one fuel rod capsule is preferably introduced into the test container underwater, and the water that has penetrated into the test container is replaced by a purge gas. For this purpose, the purge gas is introduced into the test container under pressure.

The purge gas preferably remains in the test container for a predefinable period of time before the gas stream containing the purge gas and the test gas that has diffused from the fuel rod capsule is supplied to the mass spectrometer. Under given criteria, which include the pressures and temperatures prevailing at the individual components, the leak rate may be determined from the detected concentration, and the tested fuel rod capsule may be classified with regard to its leak-tightness.

In one particularly preferred exemplary embodiment, the test container is flooded with water from the pool in order to generate the gas stream. The test container is in particular flooded in a controlled manner after the predefinable time period has elapsed, in order to supply the gas stream containing test gas to the sampling point.

The gas stream supplied to the sampling point of the mass spectrometer is preferably regulated with respect to its volume in such a way that a constant pressure prevails at the sampling point.

In one preferred exemplary embodiment, a gas mixture containing a test gas and purge gas is supplied in a predefined mixing ratio to the sampling point in a controlled manner. For purposes of calibrating the mass spectrometer, the supplying of the gas mixture in the predefined mixing ratio may take place before start-up of the mass spectrometer.

Components of the device, in particular lines and/or line sections, that are situated outside the pool are preferably heated, at least in sections, during operation. The occurrence of relatively large temperature gradients, which facilitate condensation in the gas stream, may be counteracted in this way.

An inert gas may be used as the test gas. Argon is particularly preferably used as test gas. If the encapsulation of the fuel rods into the fuel rod capsules takes place in the same pool of the nuclear plant, it is provided to carry out the encapsulation and the leak testing at different locations within the pool. The reason is that argon has relatively good water solubility. Therefore, the measuring results may be skewed by argon-containing residual moisture remaining in the test container. This effect is at least minimized by a spatial separation of the operations that include the encapsulation and the leak testing.

The water is preferably removed from the test container to the greatest extent possible. This may take place, for example, by using high-quality nitrogen as purge gas.

BRIEF DESCRIPTION OF THE DRAWINGS

Possible exemplary embodiments of the invention are explained in greater detail below with reference to the drawings, which show the following.

Mutually corresponding parts are provided with the same reference numerals in all figures.

DETAILED DESCRIPTION

Figure 1:
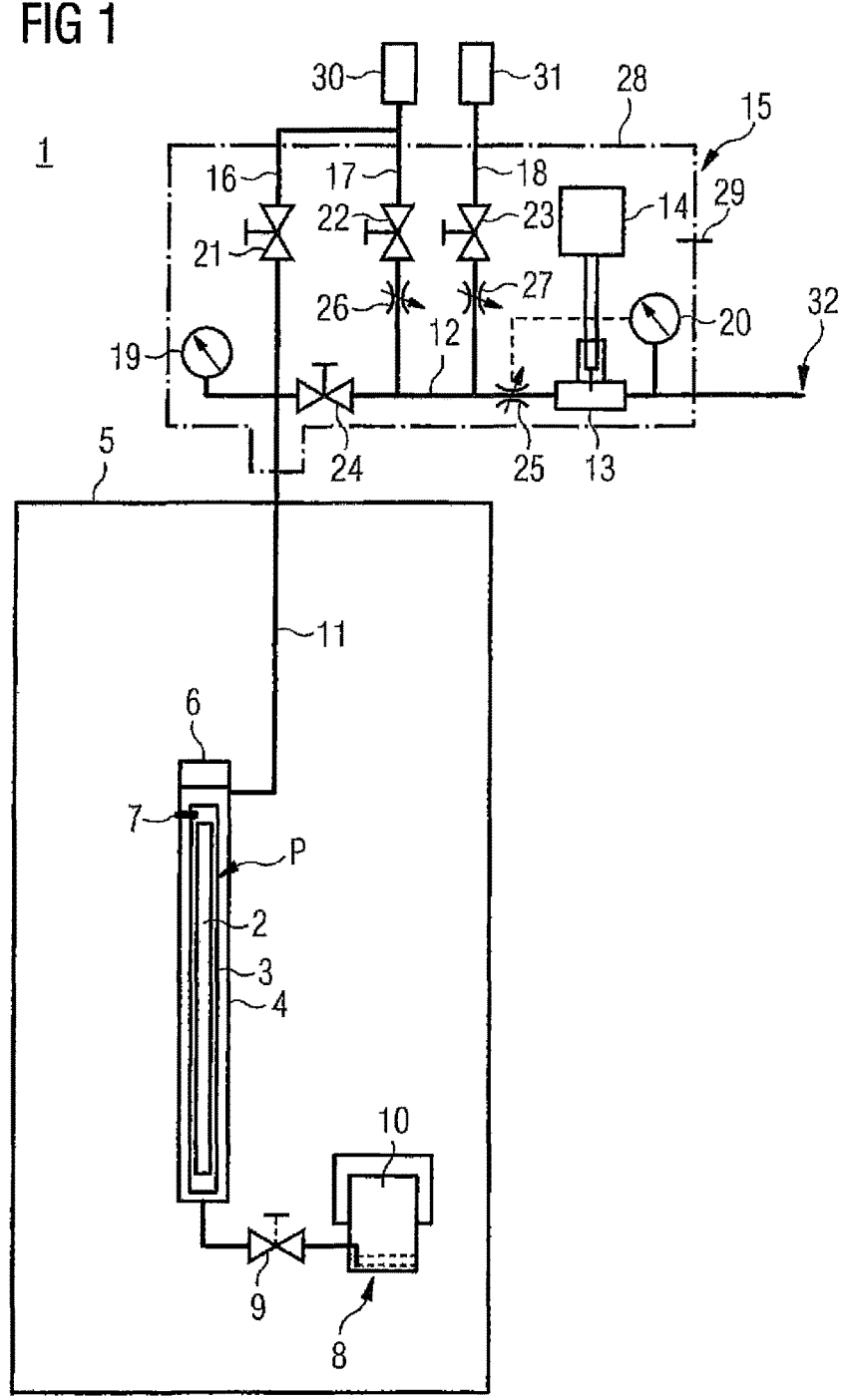
FIG. 1: shows a device for carrying out a leak test on a fuel rod capsule containing at least one fuel rod and test gas according to a first exemplary embodiment of the invention.

FIG. 1 shows the schematic design of a device 1 for carrying out a leak test on a fuel rod capsule 3 containing at least one fuel rod 2 and test gas P according to a first exemplary embodiment of the invention.

In the example shown, the fuel rod capsule 3 is filled with argon as test gas P. An internal pressure of approximately 2.5 to 3.5 bar is present within the fuel rod capsule 3.

The fuel rod capsule 3 is introduced [into] a test container 4 situated in a pool 5 of a nuclear plant. The pool 5 is filled with water, and the test container 4 is lowered into the pool 5, beneath the water surface.

The test container 4 has a closeable opening 6 on the end, through which the fuel rod capsule 3 may be introduced into the test container 4 underwater. A first temperature sensor 7 for measuring the temperature inside the test container 4 is situated in the area of the closeable opening 6.

A connection device 8 which provides a connection to the interior of the pool is provided at the lower end of the test container 4. In the exemplary embodiment shown in FIG. 1, the connection device 8 includes a valve 9 and a gas exchange device 10. The connection device 8 that connects to the interior of the pool 5 is used as an outlet for water that has penetrated inside the test container 4. In addition, the connection device 8 allows controlled flooding of the test container 4 with water from the pool 5 in order to convey a gas column, present inside the test container 4, in the direction of a sampling point 13 for a mass spectrometer 14 via lines 11, 12.

The device 1 includes components that are associated with an analysis unit 15 situated outside the pool 5. The components associated with the analysis unit 15 include in particular lines 12, 16, 17, 18 and a section of the line 11. In addition, the analysis unit 15 includes pressure sensors 19, 20, valves 21, 22, 23, 24, volume control valves 25, 26, 27, the sampling point 13, and the mass spectrometer 14. The components of the analysis unit 15 are provided with thermal insulation 28 to counteract in particular condensation in the gas stream while the leak test is being carried out. A second temperature sensor 29 is provided for detecting the temperature inside the analysis unit 15.

The volume control valve 25 situated at the inlet to the sampling point 13 is connected to the pressure sensor 20 (illustrated by dashed lines). The pressure at the sampling point is controllable and in particular regulatable by means of the volume control valve 25 and the pressure sensor 20 in such a way that the supplying of the gas stream to the mass spectrometer 14 takes place at essentially constant pressure.

Purge gas, which in the illustrated example is nitrogen, is stored under pressure in a first reservoir 30. An additional, second reservoir 31 contains test gas, which in the example shown here is nitrogen with a small proportion of argon as test gas P, under pressure. The sampling point 13 is suppliable via the lines 12, 17, 18 with purge gas or test gas in particular for purging or calibrating the mass spectrometer 14. For this purpose, the volumetric flow of the purge gas and test gas may be set by means of the volume control valves 22, 23.

The method for carrying out the leak test on the fuel rod capsule 3 takes place using the device 1 shown in FIG. 1, as follows:

First, all valves 9, 21, 22, 23, 24 are closed and the gas exchange device 10 is filled with water. The end-side opening 6 of the test container 4 is subsequently opened, and the fuel rod capsule 3 is introduced into the test container 4 underwater. The opening 6 of the test container 4 is then reclosed, and the water that has penetrated into the test container 4 is largely removed. This takes place by opening the valves 9, 21 and feeding purge gas from the first reservoir 30. The water present in the test container 4 is thus displaced, and ejected into the pool via the connection device 8. The test container 4 is adequately flushed with purge gas in order to sufficiently reduce the interior wetting of the test container 4 with water. Excess purge gas exits the device 1 via the connection device 8. During purging, purge gas is introduced into an internal first container of the gas exchange device 10 which contains water. In the process, a gas exchange of gases dissolved in the water takes place. In particular, dissolved argon may thus be replaced by nitrogen. In addition, a second container of the gas exchange device 10 which surrounds the first container is at least partially filled with purge gas during purging. The first and second containers of the gas exchange device 10 are dimensioned in such a way that no water from the pool 5 flows into the test container 4 during flooding of the test container.

The valves 9, 21 are subsequently closed. A gas receiver which prevents overflow of water from the pool 5 remains in a dome area of the gas exchange device 10. The water present in the exchange device 10 is largely free of air and/or argon. The internal pressure inside the test container 4 is reduced after the valve 24 is opened. In the example shown here, the internal pressure is set to approximately 1 bar. The valve 24 is then reclosed.

To increase the concentration of test gas P in the test container 4, a predefinable time period, which in the present case is one hour by way of example, is awaited before the gas column present in the test container 4 is supplied to the mass spectrometer 14 for analysis. During this time period, the valve 22 is opened and the line 12 is flushed with purge gas, so that no air can penetrate from the outside via an end-side outlet 32 of the line 12.

The volume control valve 22 provided for supplying purge gas is set in such a way that compensation may take place via the volume control valve 25 situated at the inlet to the sampling point 13. In particular, the gas stream is adjusted in such a way that the pressure measured by the pressure sensor 20 remains at a virtually constant level during operation of the mass spectrometer 14.

The calibration of the mass spectrometer 14 preferably takes place during the predefinable time period, which is used primarily for accumulating test gas P inside the test container 4. For this purpose, the valve 23 is first opened before the valve 22 is closed. The sampling point 13 is then in fluidic connection with the second reservoir 31, in which test gas P is stored under pressure. The volume control valve 23 is hereby set in such a way that compensation may take place by means of the further volume control valve 25, so that an essentially constant pressure is present at the sampling point 13.

After calibration of the mass spectrometer 13, the valve 22 is first reopened before the valve 23 is closed. After the predefinable time period has elapsed, the valves 9, 24 are opened and the valve 22 is closed to allow water to flow from the pool 5 via the gas exchange device 10 into the test container 4. The water flows into the test container 4 due to the hydrostatic pressure, and transports the gas column present in the test container 4 in the direction of the sampling point 13. The mass spectrometer 14 detects the concentration of test gas P, in the present case argon, in the gas stream. The inertia of the measuring system, i.e., the minimum measuring time, should be taken into consideration. The volumetric flow is therefore compensated for in such a way that a constant pressure is present at the sampling point 13. The leak rate is calculated from the detected concentration, with inclusion of the measured pressures and temperatures.

After the measurement, the valve 24 is reclosed, the test container 4 is opened, and the fuel rod capsule 3 is removed.

Figure 2:
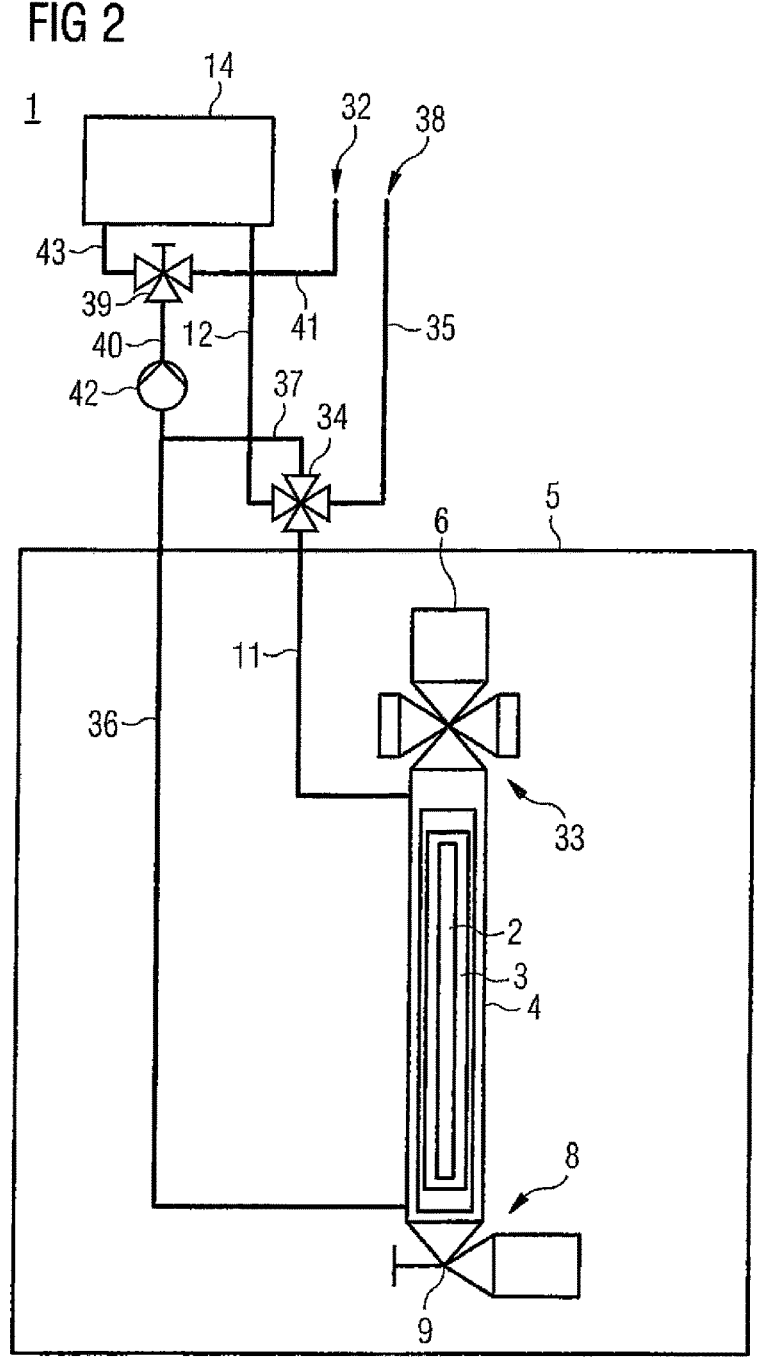
FIG. 2: shows a device for carrying out a leak test on a fuel rod capsule containing at least one fuel rod and test gas according to a second exemplary embodiment of the invention.

FIG. 2 shows a device 1 for carrying out a leak test according to a second exemplary embodiment of the invention. The mode of operation of the exemplary embodiment shown corresponds essentially to the device in the first exemplary embodiment, so that reference is first made to this description.

The exemplary embodiment shown in FIG. 2 has a vacuum pump 42 for supplying the gas stream to the mass spectrometer 14. In addition, valves 33, 34, 43 are provided, which are designed as ball valves for providing fluidic connections between lines 11, 12, 35, 36, 37, 40, 41, 43.

The method for carrying out the leak test takes place using the device 1 of the second exemplary embodiment, illustrated in FIG. 2, as follows:

The fuel rod capsule 3 is first introduced into the test container 4 via the end-side opening 6. For this purpose, the valve 33, designed as a ball valve, is opened in the direction of the test container 4. The valve 9 is likewise opened in the conducting direction. The fuel rod capsule 3 which is introduced into the test container 4 extends to just below the valve 33.

The water that has penetrated into the test container 4 during insertion of the fuel rod capsule 3 is subsequently expelled from the test container 4. For this purpose, the valve 33 is first closed and the valve 9 is opened. A reservoir, in particular a gas cylinder, containing the purge gas under pressure is connected to an inlet 38. The valve 34 is set in such a way that the line 35 and the line 12 are fluidically connected to one another. The water is subsequently expelled from the test container 4, via the connection device 8, into the pool 5 by blowing in purge gas, in particular nitrogen. The line 35 is subsequently fluidically connected via the line 37, and by switching the valve 34, to the lines 36 and 40. The lines 36, 40 are likewise blown free by blowing in purge gas. When the test container 4 or the lines 35, 36, 37, 40 contain(s) only slight residual quantities of water, the valve 9 is closed.

To generate a negative pressure in the test container 4, the valve 34 is first set in such a way that a fluidic connection is provided between the lines 11, 12. Correspondingly, the valve 39 is set in such a way that the lines 40, 41 are connected. The vacuum pump 42 is subsequently put into operation. After the required differential pressure between the interior of the fuel rod capsule 3 and the interior of the test container 4 is reached, the evacuation is discontinued, and the valve 39 is switched in such a way that the lines 40, 43 are fluidically connected to one another.

The vacuum pump 42 continues operation even after the required negative pressure inside the test container 4 is reached, in order to continuously convey purge gas together with possible released portions of the test gas from the test container 4 to the mass spectrometer 14 and back again. The conveyed gas stream is analyzed for the contained proportions of test gas by means of the mass spectrometer 14. The leak rate is then determined from the measured concentration and the testing time, with inclusion of the other state variables.

The invention has been described above with reference to preferred exemplary embodiments. However, it is understood that the invention is not limited to the specific design of the exemplary embodiments shown. Rather, based on the description, a competent person skilled in the art can derive variations without departing from the essential basic concept of the invention.

| List of reference numerals | |
| --- | --- |
| 1 | device |
| 2 | fuel rod |
| 3 | fuel rod capsule |
| 4 | test container |
| 5 | pool |
| 6 | opening |
| 7 | temperature sensor |
| 8 | connection device |
| 9 | valve |
| 10 | gas exchange device |
| 11 | line |
| 12 | line |
| 13 | sampling point |
| 14 | mass spectrometer |
| 15 | analysis unit |
| 16 | line |
| 17 | line |
| 18 | line |
| 19 | pressure sensor |
| 20 | pressure sensor |
| 21 | valve |
| 22 | valve |
| 23 | valve |
| 24 | valve |
| 25 | volume control valve |
| 26 | volume control valve |
| 27 | volume control valve |
| 28 | insulation |
| 29 | temperature sensor |
| 30 | reservoir |
| 31 | reservoir |
| 32 | outlet |
| 33 | valve |
| 34 | valve |
| 35 | line |
| 36 | line |
| 37 | line |
| 38 | inlet |
| 39 | valve |
| 40 | line |
| 41 | line |
| 42 | vacuum pump |
| 43 | line |
| P | test gas |

The invention claimed is:

1. A device for carrying out a leak test on a fuel rod capsule containing at least one fuel rod and test gas, the device comprising a test container which is designed for accommodating at least one fuel rod capsule and which is lowerable into a water-flooded pool of a nuclear plant, characterized in that a mass spectrometer is fluidically connected to the interior of the test container in such a way that the mass spectrometer may be supplied with a gas stream for detecting a concentration of the test gas that has diffused from the fuel rod capsule into the test container, and characterized in that the test container is evacuable in such a way that an internal pressure that is reduced compared to a hydrostatic pressure caused by water surrounding the test container is settable in the interior of the test container.

2. The device according to claim 1, characterized in that argon is provided as the test gas, and the mass spectrometer detects the concentration of the argon that has diffused from the fuel rod capsule.

3. The device according to claim 1, characterized in that the test container at a lower end has a connection device that connects to the interior of the pool.

4. The device according to claim 3, characterized in that the connection device in the pool is situated at a depth below the water surface, and an upper end of the test container is fluidically connectable to a first reservoir in which a purge gas is storable under pressure, the pressure being greater than the hydrostatic pressure of the surrounding water corresponding to the depth of the connection device.

5. The device according to claim 4, characterized in that the first reservoir is fluidically connectable to a sampling point of the mass spectrometer.

6. The device according to claim 4, characterized in that the sampling point of the mass spectrometer is fluidically connectable to a second reservoir in which test gas is storable under pressure.

7. The device according to claim 6, characterized in that at least one volume control valve is situated between the sampling point and the first reservoir, and/or between the sampling point and the second reservoir.

8. The device according to claim 3, characterized in that the interior of the test container at the upper end is fluidically connectable to a sampling point of the mass spectrometer in such a way that a gas column that is present in the test container is conveyable to the sampling point by introducing water via the connection device situated at the lower end of the test container.

9. The device according to claim 4, characterized in that a volumetric flow of the gas stream supplied to the sampling point of the mass spectrometer is changeable by means of an adjustment device, in particular at least one further volume control valve or a vacuum pump.

10. The device according to claim 9, characterized in that the adjustment device is connected to a pressure sensor for measuring the pressure at the sampling point.

11. The device according to claim 1, characterized in that the at least one fuel rod capsule is introducible into the test container via a closeable opening on the upper end.

12. The device according to claim 1, characterized in that components of the device, in particular lines and/or line sections, situated outside the pool have thermal insulation, at least in sections.

13. The device according to claim 12, characterized in that the components situated outside the pool are heatable, at least in sections, by means of a heating device.

14. A method for carrying out a leak test on a fuel rod capsule containing at least one fuel rod and test gas, using a device according to one of the preceding claims, wherein at least one fuel rod capsule is introduced into a test container that is lowered into a flooded pool of a nuclear plant, characterized in that a gas stream containing test gas that has diffused from the fuel rod capsule into the test container is supplied to a mass spectrometer, and a concentration of the test gas that has diffused from the fuel rod capsule into the test container is detected in the gas stream by means of the mass spectrometer in order to determine a leak rate, and characterized in that the at least one fuel rod capsule is introduced into the test container underwater, and the water that has penetrated into the test container is replaced by a purge gas.

15. The method according to claim 14, characterized in that the purge gas remains in the test container for a predefinable period of time before the gas stream containing the purge gas and the test gas that has diffused from the fuel rod capsule is supplied to the mass spectrometer.

16. The method according to claim 14, characterized in that the test container is flooded with water from the pool in order to generate the gas stream.

17. The method according to claim 14, characterized in that the gas stream is supplied to the mass spectrometer at a sampling point, and a volumetric flow of the gas stream is regulated in such a way that a constant pressure prevails at the sampling point.

18. The method according to claim 17, characterized in that a gas mixture containing a purge gas or test gas is supplied in a predefined mixing ratio to the sampling point in a controlled manner.

19. The method according to claim 14, characterized in that components of the device, in particular lines and/or line sections, that are situated outside the pool are heated, at least in sections.

20. The method according to claim 14, characterized in that an inert gas is used as the test gas.

21. The method according to claim 14, characterized in that argon is used as the test gas.

22. A device for carrying out a leak test on a fuel rod capsule containing at least one fuel rod and test gas, the device comprising a test container which is designed for accommodating at least one fuel rod capsule and which is lowerable into a water-flooded pool of a nuclear plant, characterized in that a mass spectrometer is fluidically connected to the interior of the test container in such a way that the mass spectrometer may be supplied with a gas stream for detecting a concentration of the test gas that has diffused from the fuel rod capsule into the test container, and characterized in that the test container at a lower end has a connection device that connects to the interior of the pool.

23. A device for carrying out a leak test on a fuel rod capsule containing at least one fuel rod and test gas, the device comprising a test container which is designed for accommodating at least one fuel rod capsule and which is lowerable into a water-flooded pool of a nuclear plant, characterized in that a mass spectrometer is fluidically connected to the interior of the test container in such a way that the mass spectrometer may be supplied with a gas stream for detecting a concentration of the test gas that has diffused from the fuel rod capsule into the test container, and characterized in that a volumetric flow of the gas stream supplied to a sampling point of the mass spectrometer is changeable by means of an adjustment device, in particular at least one further volume control valve or a vacuum pump.

24. A method for carrying out a leak test on a fuel rod capsule containing at least one fuel rod and test gas, using a device according to one of the preceding claims, wherein at least one fuel rod capsule is introduced into a test container that is lowered into a flooded pool of a nuclear plant, characterized in that a gas stream containing test gas that has diffused from the fuel rod capsule into the test container is supplied to a mass spectrometer, and a concentration of the test gas that has diffused from the fuel rod capsule into the test container is detected in the gas stream by means of the mass spectrometer in order to determine a leak rate, and characterized in that the test container is flooded with water from the pool in order to generate the gas stream.

25. A method for carrying out a leak test on a fuel rod capsule containing at least one fuel rod and test gas, using a device according to one of the preceding claims, wherein at least one fuel rod capsule is introduced into a test container that is lowered into a flooded pool of a nuclear plant, characterized in that a gas stream containing test gas that has diffused from the fuel rod capsule into the test container is supplied to a mass spectrometer, and a concentration of the test gas that has diffused from the fuel rod capsule into the test container is detected in the gas stream by means of the mass spectrometer in order to determine a leak rate, and characterized in that the gas stream is supplied to the mass spectrometer at a sampling point, and a volumetric flow of the gas stream is regulated in such a way that a constant pressure prevails at the sampling point.

26. A method for carrying out a leak test on a fuel rod capsule containing at least one fuel rod and test gas, using a device according to one of the preceding claims, wherein at least one fuel rod capsule is introduced into a test container that is lowered into a flooded pool of a nuclear plant, characterized in that a gas stream containing test gas that has diffused from the fuel rod capsule into the test container is supplied to a mass spectrometer, and a concentration of the test gas that has diffused from the fuel rod capsule into the test container is detected in the gas stream by means of the mass spectrometer in order to determine a leak rate, and characterized in that a gas mixture containing a purge gas or test gas is supplied in a predefined mixing ratio to a sampling point in a controlled manner.

* * * * *